United States Patent
Schofield

(10) Patent No.: US 7,123,168 B2
(45) Date of Patent: Oct. 17, 2006

(54) DRIVING SEPARATION DISTANCE INDICATOR

(75) Inventor: Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 305 days.

(21) Appl. No.: 10/422,512

(22) Filed: Apr. 24, 2003

(65) Prior Publication Data

US 2004/0012488 A1 Jan. 22, 2004

Related U.S. Application Data

(60) Provisional application No. 60/375,524, filed on Apr. 25, 2002.

(51) Int. Cl.
*G08G 1/017* (2006.01)

(52) U.S. Cl. .................. 340/937; 340/435; 701/45; 342/70

(58) Field of Classification Search .......... 340/435, 340/436, 937, 903, 904; 700/300, 301; 701/45, 701/300, 301; 180/271, 250, 275; 348/143, 348/148, 161; 342/70, 71, 72
See application file for complete search history.

(56) References Cited

U.S. PATENT DOCUMENTS

| | | | |
|---|---|---|---|
| 2,296,667 A | 9/1942 | Hemphill | 177/337 |
| 4,357,594 A | 11/1982 | Ehrlich et al. | 340/72 |
| 4,600,913 A | 7/1986 | Caine | 340/104 |
| 4,630,904 A | 12/1986 | Pastore | 362/494 |
| 4,807,101 A | 2/1989 | Milde, Jr. | 362/276 |
| 4,890,091 A | 12/1989 | Gage, Sr. et al. | 340/467 |
| 4,918,424 A | 4/1990 | Sykora | 340/464 |
| 5,017,904 A | 5/1991 | Browne et al. | 340/479 |
| 5,037,182 A | 8/1991 | Groves et al. | 359/630 |
| 5,059,947 A | 10/1991 | Chen | 340/467 |
| 5,111,181 A | 5/1992 | Priesemuth | 340/467 |
| 5,139,327 A | 8/1992 | Tanaka | 356/1 |
| 5,173,881 A | 12/1992 | Sindle | 367/101 |
| 5,177,685 A | 1/1993 | Davis et al. | 701/35 |
| 5,235,316 A | 8/1993 | Qualizza | 340/436 |
| 5,258,895 A | 11/1993 | Bosse | 362/281 |
| 5,303,205 A | 4/1994 | Gauthier et al. | 367/108 |
| 5,309,141 A | 5/1994 | Mason et al. | 340/467 |
| 5,339,075 A | 8/1994 | Abst et al. | 340/903 |
| 5,373,482 A | 12/1994 | Gauthier | 367/99 |
| 5,410,294 A | 4/1995 | Gold | 340/464 |
| 5,416,313 A | 5/1995 | Larson et al. | 250/214 |
| 5,481,243 A | 1/1996 | Lurie et al. | 340/467 |
| 5,486,832 A | 1/1996 | Hulderman | 342/70 |
| 5,502,432 A | 3/1996 | Ohmamyuda et al. | 340/436 |
| 5,528,217 A | 6/1996 | Adams | 340/435 |
| 5,530,240 A | 6/1996 | Larson et al. | 359/839 |

(Continued)

*Primary Examiner*—Anh V. La
(74) *Attorney, Agent, or Firm*—Van Dyke, Gardner, Linn & Burkhart, LLP

(57) ABSTRACT

A driving separation indication system for a vehicle includes an imaging sensor, a control and at least one indicator. The control is operable to process an image captured by the imaging sensor representative of a scene occurring exteriorly of the subject vehicle and to detect another vehicle via processing of the image. The control is operable to determine a threshold interspacing distance in response to a speed of the subject vehicle, and is operable to determine a distance from the subject vehicle to the detected other vehicle. The control is operable to at least occasionally actuate the indicator in response to the distance from the subject vehicle to the other vehicle being less than or equal to the threshold interspacing distance. The control may generally continuously determine the speed of the vehicle and the threshold interspacing distance to provide an appropriate threshold interspacing distance.

32 Claims, 1 Drawing Sheet

U.S. PATENT DOCUMENTS

| | | |
|---|---|---|
| 5,541,891 A | 7/1996 | Waldmann et al. ............ 367/99 |
| 5,550,677 A | 8/1996 | Schofield et al. ............ 359/604 |
| 5,574,426 A | 11/1996 | Shisgal et al. .............. 340/435 |
| 5,581,464 A | 12/1996 | Woll et al. ................... 701/35 |
| 5,587,699 A | 12/1996 | Faloon et al. ................. 362/30 |
| 5,589,817 A | 12/1996 | Furness ...................... 340/467 |
| 5,610,578 A | 3/1997 | Gilmore ..................... 340/479 |
| 5,621,514 A | 4/1997 | Paranto et al. ............... 180/169 |
| 5,663,707 A | 9/1997 | Bartilucci ................... 340/464 |
| 5,670,935 A | 9/1997 | Schofield et al. ........... 340/461 |
| D391,214 S | 2/1998 | Hook et al. ................. D12/187 |
| 5,734,337 A * | 3/1998 | Kupersmit .................. 340/937 |
| 5,736,926 A | 4/1998 | Winholtz .................... 340/479 |
| 5,786,772 A | 7/1998 | Schofield et al. ........... 340/903 |
| 5,796,094 A | 8/1998 | Schofield et al. ........ 250/208.1 |
| 5,798,575 A | 8/1998 | O'Farrell et al. .......... 307/10.1 |
| 5,867,133 A | 2/1999 | Toffolo et al. ................. 345/7 |
| 6,020,814 A | 2/2000 | Robert ....................... 340/467 |
| 6,089,721 A | 7/2000 | Schierbeek ................. 359/603 |
| 6,124,647 A | 9/2000 | Marcus et al. ............. 307/10.1 |
| 6,133,852 A | 10/2000 | Tonkin ....................... 340/903 |
| 6,157,295 A | 12/2000 | Steiner et al. .............. 340/440 |
| 6,291,905 B1 | 9/2001 | Drummond et al. ........ 307/10.1 |
| 6,291,906 B1 | 9/2001 | Marcus et al. ............. 307/10.1 |
| 6,313,454 B1 | 11/2001 | Bos et al. ................. 250/208.1 |
| 6,320,176 B1 | 11/2001 | Schofield et al. ......... 250/208.1 |
| 6,353,392 B1 | 3/2002 | Schofield et al. ........... 340/602 |
| 6,396,397 B1 | 5/2002 | Bos et al. ................... 340/461 |
| 6,411,204 B1 | 6/2002 | Bloomfield et al. ........ 340/467 |
| 6,534,884 B1 | 3/2003 | Marcus et al. ............. 307/10.1 |
| 6,590,495 B1 * | 7/2003 | Behbehani ................. 340/435 |
| 6,724,300 B1 * | 4/2004 | Miyakoshi et al. ......... 340/435 |
| 6,737,963 B1 * | 5/2004 | Gutta et al. ................ 340/435 |
| 2003/0025597 A1 | 2/2003 | Schofield .................... 340/436 |

* cited by examiner

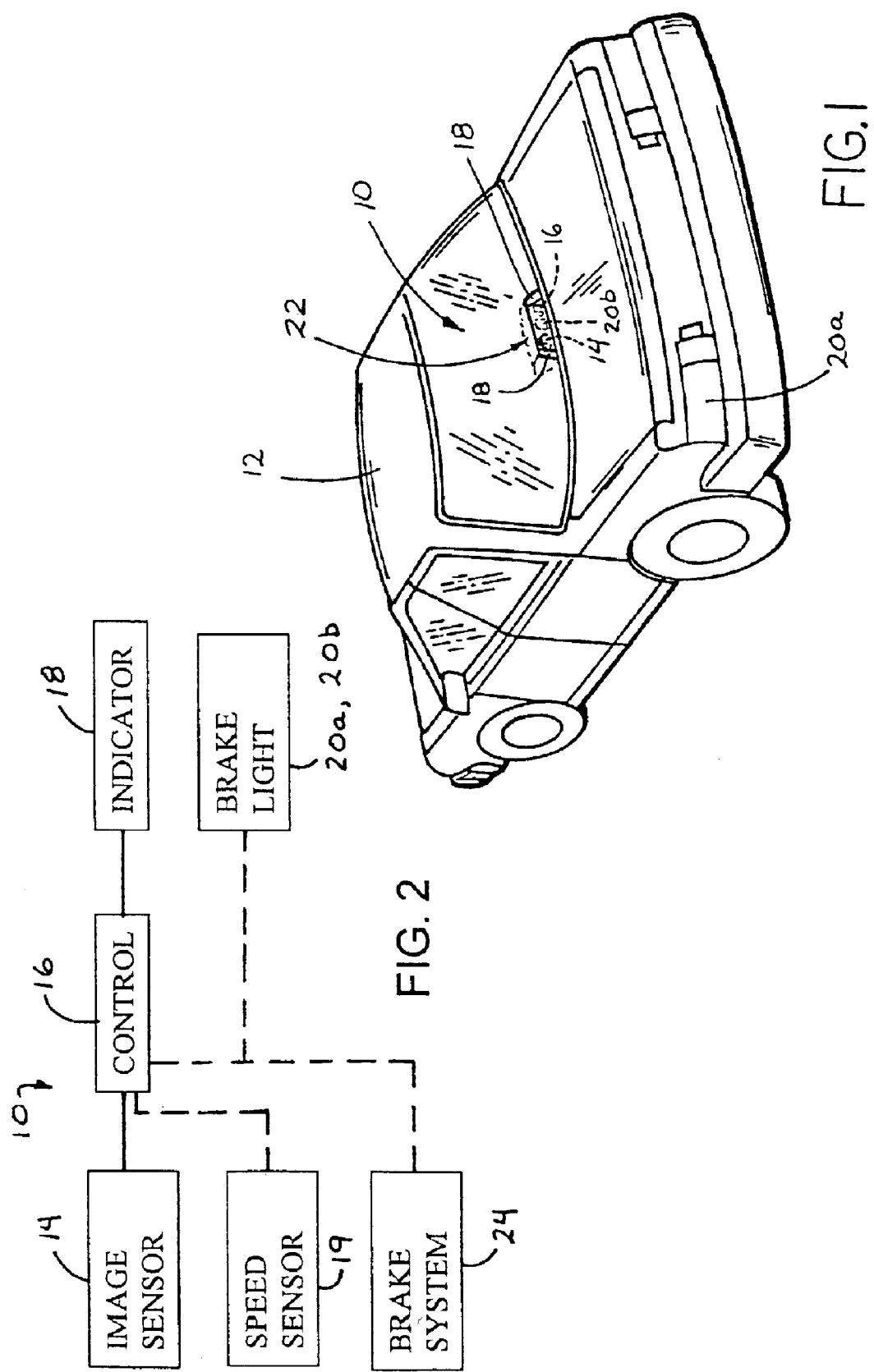

DRIVING SEPARATION DISTANCE INDICATOR

CROSS REFERENCE TO RELATED APPLICATION

The present application claims priority of U.S. provisional application, Ser. No. 60/375,524, filed Apr. 25, 2002 by Schofield, which is hereby incorporated herein by reference in its entirety.

FIELD OF THE INVENTION

The present invention relates generally to a warning or indicating system for a vehicle and, more particularly, to a warning system which is operable to alert a driver of a following vehicle that the following vehicle is within a threshold separation distance of the subject vehicle.

BACKGROUND OF THE INVENTION

Drivers which allow an insufficient distance between their vehicle and the vehicle ahead of their vehicle may cause a traffic accident if the leading vehicle suddenly slows down. In the event of the driver of the leading vehicle responding to a situation with hard braking, the driver of the following vehicle may have insufficient time to notice and react to the illumination of the leading vehicle's brake lights, determine the required severity of braking, and decelerate sufficiently to avoid running into the rear of the leading vehicle. This error in judgment of a safe separation distance appears to increase at higher speeds, often resulting in catastrophic or even fatal accidents. The introduction of a center high mounted stop light (CHMSL) has greatly improved the rate at which the following driver notices the illumination of the leading vehicle's brake lights. However, this does not help reduce the driver's reaction times or vehicle braking rates.

Typical driver reaction times may vary between approximately 0.5 seconds and approximately 1.5 seconds, depending on how much a driver may be "driving ahead", that is, monitoring traffic activity ahead of the leading vehicle. The vehicle's braking system also has a response time, and the degree of braking achieved depends on the weight of the vehicle, the speed of the vehicle, the design of the brake system, the state of wear or repair of the brake system, the design and degree of wear of the vehicle tires, the road surface, weather conditions and/or any other design parameters or conditions which may affect the stopping rate or deceleration of the vehicle. Many of these factors may also affect the ability of the driver of the following vehicle to control the vehicle path under severe braking conditions, which often results in an increase in the damage caused during this type of accident.

Many organizations concerned with road safety publish recommendations for safe separation distances between vehicles driving along a road. In some cases, these recommendations are made in meters, feet or car lengths at particular speeds quoted in kilometers per hour or miles per hour. In other cases, the driver is advised to note the distance traveled by his or her vehicle in a particular number of seconds as a separation guide. However, the driver's inability to retain this advice, relate the advice to a particular traffic condition at any time, and adhere to the advice is one of the causes of the type of accident described above.

A vehicle driver typically has two main concerns in this regard. First, whether the separation distance behind a leading vehicle is sufficient, and second, whether a following vehicle is too close to be able to react safely in the event of an emergency. Forward separation is the responsibility of the vehicle driver and is generally under his or her control. However, rearward separation is the responsibility of the driver of the following vehicle and is generally not under the control of the driver of the leading vehicle. However, it is not uncommon, if a driver is threatened by the closeness of a following vehicle, for the driver of the leading vehicle to tap the brake pedal in order to illuminate the vehicle brake lights, thus causing the following driver to brake and increase the separation distance between the vehicles.

SUMMARY OF THE INVENTION

The present invention is intended to provide an indication or alert system which is operable to alert the driver of a following vehicle that the following vehicle is at a potentially unsafe distance from the subject vehicle. The threshold unsafe distance at which the indication system is activated may vary in response to the speed of the vehicle, the driving conditions and/or the like.

According to an aspect of the present invention, a driving separation distance indication system for a vehicle includes an imaging sensor, a control and at least one indicator. The imaging sensor is mounted at the vehicle and is operable to capture an image of a scene exteriorly of the vehicle. The control is operable to determine a threshold interspacing distance in response to at least the speed of the vehicle. The control is operable to process the image and to detect another vehicle spaced from the subject vehicle via processing of the image. The control is operable to determine a separation distance between the subject vehicle and the other vehicle. The control is operable to at least occasionally activate the at least one indicator in response to the determined distance from the subject vehicle to the other vehicle being less than or equal to the threshold interspacing or separation distance.

The driving separation distance indication system may be operable to generally continuously calculate or otherwise determine the threshold separation distance. The imaging sensor may comprise an imaging array sensor.

Optionally, the control and imaging sensor may be operable to detect and monitor the lane or lanes on the driving surface to confirm that the other vehicle is in the same lane as the subject vehicle.

The imaging sensor may be positioned at a center, rearward portion of the subject vehicle and may be operable to detect a vehicle following the subject vehicle. The imaging sensor may comprise an imaging array sensor. The indicator of the indication system may be a stop lamp of the subject vehicle or may be a separate indicator, preferably positioned in the vicinity of a center high mounted stop light of the subject vehicle.

In one form, the driving separation distance indication system may be self-contained in a module which is mountable to the vehicle and connectable to a power and ground circuit of the vehicle, such that minimal connections and modifications to the subject vehicle are necessary for installation of the driving separation distance indication system.

Therefore, the present invention provides a driving separation indicating system which is operable to determine a separation or interspacing distance between a subject vehicle and another vehicle and is operable to indicate to the driver of the other vehicle that he or she is within or closer than a threshold "safe" separation or interspacing distance from the subject vehicle. The present invention thus provides a warning or alert system which is automatically operable to alert the driver of the other vehicle that he or she may be traveling at an unsafe distance from the subject vehicle. The driver of the other or following vehicle may then decelerate until the following vehicle is again at a safe separation distance from the subject vehicle.

These and other objects, advantages, purposes and features of the present invention will become apparent upon review of the following specification in conjunction with the drawings.

BRIEF DESCRIPTION OF THE DRAWINGS

FIG. 1 is a rear perspective view of a vehicle incorporating a driving separation warning system in accordance with the present invention; and FIG. 2 is a block diagram of a driving separation warning system in accordance with the present invention.

DESCRIPTION OF THE PREFERRED EMBODIMENTS

Referring now to the drawings and the illustrative embodiment depicted therein, a driving separation warning or indication system 10 is mounted at a vehicle 12 and is operable to provide a warning, indication or alert to a driver of a following vehicle that the following vehicle is within a threshold separation distance or interspacing distance or following distance from the subject vehicle 12 (FIG. 1). The driving separation warning system 10 includes an imaging sensor 14, a control 16 and an indicator 18 (FIGS. 1 and 2). The control 16 is operable to at least occasionally activate the indicator in response to a signal or image from the imaging sensor and a threshold separation distance. The indicator may be viewable by the driver of the other vehicle and thus may alert the driver that he or she is traveling too close to the subject vehicle. The threshold separation or interspacing distance may be substantially continuously calculated or otherwise determined at least in response to the speed of the vehicle, such as in response to a signal from a speed sensor 19 or other control or system of the vehicle.

The imaging sensor is positioned at a vehicle and has a field of view exteriorly of the vehicle. For example, and as shown in FIG. 1, the imaging sensor may be positioned at a rearward portion of the vehicle and may have a field of view rearward of the vehicle. The imaging sensor may be operable to capture an image of the scene occurring rearwardly of the vehicle and to generate an output signal representative of the captured image. The imaging sensor useful with the present invention may comprise an imaging array sensor having an array of photosensing pixels, such as a CMOS sensor or a CCD sensor or the like, such as the types disclosed in commonly assigned U.S. Pat. Nos. 5,550,677; 5,670,935; and 5,796,094, which are hereby incorporated herein by reference.

The warning or indication system of the present invention may be operable to determine the distance between the subject vehicle and the following vehicle, or may be operable in response to a signal indicative of the separation distance. For example, the warning system may include, or may be operable in connection with, various techniques for determining the separation distance, such as radar, ultrasonics, and video imaging combined with image processing, such as utilizing the principles disclosed in U.S. patent application Ser. No. 09/372,915, filed Aug. 12, 1999 by Bos et al. for VEHICLE IMAGING SYSTEM WITH STEREO IMAGING, now U.S. Pat. No. 6,396,397, which is hereby incorporated herein by reference, and/or the like.

The threshold separation or interspacing distance at which the control activates the indicator may be determined at least in response to the speed of the subject vehicle. The threshold separation distance may also vary in response to road conditions or other selected parameters. The subject vehicle speed may be determined by processing of the images captured by the imaging sensor, or may be determined from the rearward distance detecting sensor data, or may be obtained from the existing vehicle speed sensor 19, or may be determined, calculated or obtained via other known means for detecting or measuring vehicle speed, without affecting the scope of the present invention.

Many authorities consider the distance traveled by the vehicle in three seconds to be a safe separation distance. For example, at a speed of approximately 100 kilometers per hour, a safe separation distance would be approximately 89 meters. The control of the warning system is preferably operable to generally continuously calculate or otherwise determine the safe separation or interspacing distance based on the present speed of the subject vehicle. For example, the safe or threshold separation or interspacing distance may be calculated intermittently, such as at a specified time period, or may be calculated at generally a same time as the imaging sensor is capturing images. The control is then operable to generate a signal whenever a rearward or following vehicle is detected within the generally continuously calculated or determined safe separation distance.

The threshold or safe separation distance may also be determined and varied depending on the road or driving conditions or other selected parameters. For example, the control may determine a safe threshold separation distance based on "normal" dry, daytime driving conditions, and may increase or adjust the threshold separation distance in response to weather conditions, such as in response to image processing of the images captured by the imaging sensor to detect precipitation or in response to an input from a rain sensor or the like (such as a rain sensor of the types disclosed in U.S. Pat. Nos. 6,353,392; 6,313,454; and 6,320,176, which are hereby incorporated herein by reference), or in response to traffic conditions, such as in response to image processing or a signal from another imaging system which indicates that multiple vehicles are present in the vicinity of the subject vehicle (such as in response to a signal from a lane change assist system or side object detection system or the like, such as the types disclosed in U.S. patent application Ser. No. 10/209,173, filed Jul. 31, 2002, and/or U.S. provisional applications, Ser. No. 60/433,700, filed Dec. 16, 2002; and/or Ser. No. 60/377,524, filed May 3, 2002, which are hereby incorporated herein by reference), or in response to lighting conditions, such as in response to image processing or a signal from an ambient light sensor or other system or control which indicates an ambient light level surrounding the vehicle (which may indicate daytime and nighttime driving conditions), or in response to other signals, devices, controls or systems which may provide other parameters which may affect the safe following or separation distance for a vehicle traveling behind another vehicle.

The warning system is operable to convey the safe following or separation distance information to the driver of the other or following vehicle. The control may accomplish this by flashing the vehicle brake lights 20a, flashing the center high mounted stop light (CHMSL) 20b, and/or activating or flashing an additional indicator or light 18 when the other vehicle comes within the safe interspacing distance. For example, the control may be operable to at least occasionally activate a separate rearward facing indicator 18, while the brake lights 20a, 20b may be operable in response to brake actuation. Optionally, the control may be operable to at least occasionally activate or flash the brake lights 20_a_ and/or the center high mounted stop light 20_b_ of the vehicle in response to the separation distance being less than or equal to the threshold separation or interspacing distance, while the brake lights and stop light may also be independently activatable in response to actuation of the brake system of the vehicle.

As shown in the illustrated embodiment of FIG. 1, the indicator 18 may be one or more indicators at the sides of the CHMSL (or may be positioned elsewhere on the subject vehicle). The indicator or indicators 18 may be a different color than the stop lamps of the vehicle, such as an amber color. The control may be further operable to vary the intensity of the illumination and/or the rate of flash of the indicator, in order to indicate the degree of intrusion into the safe separation distance by the following vehicle. For example, the rate of flash may increase as the other or following vehicle approaches or moves closer to the subject vehicle.

The warning or indication system of the present invention may be operable to determine whether a following vehicle is in the same lane as the subject vehicle and to respond only to a following vehicle that is in the same lane as the subject vehicle. The imaging sensor may be operable to monitor the scene rearward of the vehicle and recognize receding background image data to determine, by image processing means, the position of lane markers along the driving surface, such as by using the principles disclosed in U.S. provisional applications, Ser. No. 60/309,022, filed Jul. 31, 2001; Ser. No. 60/377,524, filed May 3, 2002 by McMahon for LANE DEPARTURE WARNING SYSTEM; and Ser. No. 60/433,700, filed Dec. 16, 2002 by Pawlicki for VEHICLE OBJECT DETECTION SYSTEM; and U.S. patent application Ser. No. 10/209,173, filed Jul. 31, 2002 by Schofield for AUTOMOTIVE LANE CHANGE AID, which are hereby incorporated herein by reference. The warning system may thus be responsive to a following vehicle within the same detected lane as the subject vehicle. The imaging sensor may be mounted at approximately the vehicle centerline to enhance the lane detection ability of the system at either side of the vehicle.

Because the lane markers or other indications of lanes or roads may be identified by the warning system of the present invention, the warning system may be operable to maintain the distance determination to a following vehicle regardless of the road or lane curvature via processing of the captured image or images. Also, because the speed of the subject vehicle may also be extracted from the video data stream, it may not be necessary to obtain a vehicle speed signal from other sensors. It is further envisioned that this may otherwise be achieved by extracting a change in the vehicle axis orientation from sequential image data and storing the data as a substantially continuously updated recent trajectory of the vehicle, or by any other means for tracking or identifying a following vehicle within the same lane as the subject vehicle, without affecting the scope of the present invention.

Optionally, the warning or indication system of the present invention may be substantially contained within a module, such as a center high mounted stop light module 22, such as shown in FIG. 1. The warning system may then be easily installed in a vehicle as an aftermarket device, without requiring any connection to other systems except to the power and ground circuits of the vehicle. For example, the warning system/stop light module 22 may be connected to at least one wire of the vehicle associated with the brake system 24 of the vehicle, such as a wire connected to one of the brake lights 20_a_ of the vehicle or to the brake pedal switch of the vehicle or the like, such that the stop light 20_b_ of the module 22 may be actuated in response to actuation of the brake system 24 by the driver. The control 16 and indicator or indicators 18 of module 22 may be powered by the vehicle power source or the module may contain a separate power source or battery. In such embodiments, the warning system may preferably be operable to determine the vehicle speed via image processing techniques, such that connection to or communication with a vehicle speed sensor or other controls or systems of the vehicle is not required. The CHMSL module may thus replace an existing CHMSL on the vehicle with minimal connections or modifications to the vehicle systems.

Optionally, the warning or indication system of the present invention may be operable to receive an image from an existing imaging sensor on the vehicle, such as an imaging sensor for a vehicle vision system, such as a rearwardly or forwardly directed vehicle vision system utilizing the principles disclosed in U.S. Pat. Nos. 5,550,677; 5,670,935; and 6,201,642, and/or in U.S. patent application, Ser. No. 09/199,907, Nov. 25, 1998 by Bos et al. for WIDE ANGLE IMAGE CAPTURE SYSTEM FOR VEHICLE, now U.S. Pat. No. 6,717,610, which are hereby incorporated herein by reference, a rearward facing lane departure warning system, a back up aid which may determine a distance to an object rearward of the vehicle, such as using the principles disclosed in U.S. patent application, Ser. No. 09/372,915, filed Aug. 12, 1999 by Bos et al. for VEHICLE IMAGING SYSTEM WITH STEREO IMAGING, now U.S. Pat. No. 6,396,397, which is hereby incorporated herein by reference, and/or the like, without affecting the scope of the present invention.

Optionally, the warning or indication system of the present invention may also or otherwise provide an indicator or display which is viewable by the driver of the subject vehicle for indicating that the following vehicle is too close to the subject vehicle. Also, although shown and described as being operable to detect a vehicle following the subject vehicle and to alert the driver of the following vehicle that he or she is too close to the subject vehicle, it is envisioned that a driving separation warning system in accordance with the present invention may be positioned on a forward portion of the subject vehicle so as to detect a leading vehicle in front of the subject vehicle and may be operable to alert the driver of the subject vehicle or the driver of the leading vehicle when the subject vehicle is within the threshold or safe interspacing distance to the leading vehicle.

It is further envisioned that the warning or indication system of the present invention may provide a warning or indication to a driver of a rearward or following vehicle or to the driver of the subject vehicle in response to other parameters, such as deceleration of the subject vehicle or other leading vehicle, such as utilizing the principles disclosed in U.S. Pat. No. 6,411,204, issued to Bloomfield et al. for DECELERATION BASED ANTI-COLLISION SAFETY LIGHT CONTROL FOR VEHICLE, which is hereby incorporated herein by reference. Optionally, the warning or indication system of the present invention may vary the output or indication to the driver of the approaching vehicle or subject vehicle depending on the distance between the vehicle and/or other parameters, such as driving conditions, deceleration of the leading vehicle and/or the like, such as by utilizing principles disclosed in U.S. Pat. Nos. 6,124,647, issued to Marcus et al. for INFORMATION DISPLAY IN A REARVIEW MIRROR; and U.S. Pat. No. 6,291,906, issued to Marcus et al. for INFORMATION DISPLAY FOR VEHICLES; and U.S. patent application Ser. No. 09/942,295, filed Aug. 29, 2001 by Marcus et al. for PROXIMITY SENSING SYSTEM FOR VEHICLES, now U.S. Pat. No. 6,534,884, which are all hereby incorporated herein by reference.

Therefore, the present invention provides a driving separation warning or indication system which may be operable to alert the driver of a vehicle following the subject vehicle and in the same lane as the subject vehicle. The warning system may provide a generally continuous calculation or determination of a "safe" separation or interspacing distance and may provide a warning signal directed rearwardly from the subject vehicle when a following vehicle is within the threshold safe separation distance. The safe separation distance may be substantially continuously calculated or otherwise determined in response to at least the speed of the subject vehicle, and may be adjusted in response to other parameters, such as driving conditions and/or the like.

The warning system of the present invention may be incorporated within a module which may be easily installed on a vehicle as an aftermarket device. The module is preferably sufficiently low cost so that it may be accessible and affordable to any driver or owner of a vehicle who wishes to have such a warning system or device installed on his or her vehicle.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. A driving separation indication system for a subject vehicle, said driving separation indication system comprising:
   an imaging sensor mounted at the subject vehicle and having a field of view generally exteriorly of the subject vehicle, said imaging sensor being operable to capture an image of a scene occurring exteriorly of the vehicle;
   a control operable to determine a threshold interspacing distance in response to a speed of the subject vehicle, said control being operable to process said image and to detect another vehicle spaced from the subject vehicle via processing of said image, said control being operable to determine a distance from the subject vehicle to the other vehicle; and
   at least one indicator operable in response to said control, said control being operable to at least occasionally actuate said at least one indicator in response to said determined distance from the subject vehicle to the other vehicle being less than or equal to said threshold interspacing distance, said at least one indicator being operable to alert the driver of the other vehicle when actuated by said control.

2. The driving separation indicating system of claim 1, wherein said control is operable to generally continuously determine said threshold interspacing distance in response to the speed of the subject vehicle.

3. The driving separation indicating system of claim 1, wherein said control is operable to determine the speed of the subject vehicle via processing of said image.

4. The driving separation indicating system of claim 1, wherein said control is operable to receive a speed input from one of a speed sensor and another control of the vehicle to determine the speed of the subject vehicle.

5. The driving separation indicating system of claim 1, wherein said control is operable to determine if a detected other vehicle is in the same lane as the subject vehicle.

6. The driving separation indicating system of claim 5, wherein said control is operable to actuate said at least one indicator in response to said control determining that the detected other vehicle is in the same lane as the subject vehicle and that the determined distance is less than or equal to said threshold interspacing distance.

7. The driving separation indicating system of claim 1, wherein said control is operable to determine said threshold interspacing distance in response to at least one of a signal from an ambient light sensor, a signal from a rain sensor, a signal from a side object detection system, a signal from a lane change assist system and a signal from a lane departure warning system.

8. The driving separation indicating system of claim 1, wherein said imaging sensor is positioned to have a field of view generally rearwardly with respect to the direction of travel of the subject vehicle, said control being operable to process said image to detect a vehicle following the subject vehicle.

9. The driving separation indicating system of claim 8, wherein said at least one indicator comprises a rear brake light of the subject vehicle.

10. The driving separation indicating system of claim 9, wherein said at least one indicator comprises a rear brake light of a center high mounted stop light of the subject vehicle.

11. The driving separation indicating system of claim 8, wherein said at least one indicator comprises at least one illumination source.

12. The driving separation indicating system of claim 11, wherein said at least one illumination source is generally contained within a housing for a center high mounted stop light of die subject vehicle.

13. The driving separation indicating system of claim 11, wherein said control is operable to flash said at least one illumination source when said distance from the subject vehicle to the following vehicle is less than or equal to said threshold interspacing distance.

14. The driving separation indicating system of claim 1, wherein said at least one indicator comprises at least one illumination source.

15. The driving separation indicating system of claim 1, wherein said at least one indicator is viewable by a driver of the other vehicle.

16. The driving separation indicating system of claim 1, wherein said imaging sensor is associated with at least one other accessory of the vehicle, said at least one other accessory comprising at least one of (a) a vision system, (b) a rain sensor, (c) a lane departure warning system, (d) a back up aid, and (e) a headlamp control.

17. The driving separation indicating system of claim 1, wherein said control is operable to determine said threshold interspacing distance in response to at least one driving condition parameter, said at least one driving condition comprising at least one of (a) a deceleration of the subject vehicle, (b) a deceleration of the other vehicle, (c) a visibility condition, (d) a traffic condition, and (e) a lighting condition.

18. A center high mounted stop lamp module for a subject vehicle comprising:
   a housing positionable at a rear portion of the subject vehicle;
   at least one indicator positioned within said housing and directed generally rearwardly with respect to the direction of travel of the subject vehicle when said housing is positioned at the rear portion of the subject vehicle, at least one of said at least one indicator being connectable to an electrical wire of the subject vehicle and activatable in response to actuation of the brake pedal of the subject vehicle; and a driving separation indicating system comprising:

an imaging sensor positioned within said housing and having a field of view generally rearwardly with respect to the direction of travel of the subject vehicle when said housing is positioned at the rear portion of the subject vehicle, said imaging sensor being operable to capture an image of a scene occurring rearwardly of the vehicle; and a control positioned within said housing and operable to determine a threshold following distance in response to a speed of the subject vehicle and at least one driving condition parameter, said control being operable to process said image and to detect a vehicle following the subject vehicle via processing of said image, said control being operable to determine a distance from the subject vehicle to the following vehicle, said at least one driving condition parameter comprising at least one of (a) a deceleration of the subject vehicle, (b) a deceleration of the other vehicle, (c) a visibility condition (d) a traffic condition, and (e) a lighting condition, said control being operable to at least occasionally actuate said at least one indicator in response to said distance from the subject vehicle to the following vehicle being less than or equal to said threshold following distance.

19. The center high mounted stop lamp module of claim 18, wherein said control is operable to generally continuously determine said threshold following distance in response to the speed of the subject vehicle.

20. The center high mounted stop lamp module of claim 18, wherein said control is operable to determine the speed of the subject vehicle via processing of said image.

21. The center high mounted stop lamp module of claim 18, wherein said control is connectable to one of a speed sensor and another control of the subject vehicle and operable to receive a speed input from said one of a speed sensor and another control of the subject vehicle to determine the speed of the subject vehicle.

22. The center high mounted stop lamp module of claim 18, wherein said control is operable to determine if a detected following vehicle is in the same lane as the subject vehicle.

23. The center high mounted stop lamp module of claim 22, wherein said control is operable to actuate said at least one indicator in response to said control determining that the detected following vehicle is in the same lane as the subject vehicle and when the determined distance is less than or equal to said threshold following distance.

24. The center high mounted stop lamp module of claim 18, wherein said control is operable to determine said threshold following distance in response to at least one of a signal from an ambient light sensor, a signal from a rain sensor, a signal from a side object detection system, a signal from a lane change assist system and a signal from a lane departure warning system.

25. The center high mounted stop lamp module of claim 18, wherein said at least one indicator comprises one illumination source, said one illumination source being independently actuatable by said control and by actuation of the brake pedal of the subject vehicle.

26. The center high mounted stop lamp module of claim 18, wherein said at least one indicator comprises at least two indicators.

27. The center high mounted stop lamp module of claim 26, wherein said at least one of said at least one indicator is actuatable in response to actuation of the brake pedal of the subject vehicle and at least one other of said at least one indicator is actuatable in response to said control.

28. The center high mounted stop lamp module of claim 27, wherein said at least two indicators comprise at least two illumination sources.

29. The center high mounted stop lamp module of claim 27, wherein said control is operable to flash said at least one other of said at least one indicator when said distance from the subject vehicle to the following vehicle is less than or equal to said threshold following distance.

30. The center high mounted stop lamp module of claim 18, wherein said control is operable to flash said at least one indicator when said distance from the subject vehicle to the following vehicle is less than or equal to said threshold following distance.

31. The center high mounted stop lamp module of claim 18, wherein said at least one indicator is viewable by a driver of the following vehicle.

32. The center high mounted stop lamp module of claim 18, wherein said imaging sensor is associated with as least one other accessory of the vehicle when said module is positioned on the vehicle, said at least one other accessory comprising at least one of (a) a vision system, (b) a rain sensor, (c) a lane departure warning system, (d) a back up aid, and (e) a headlamp control.

* * * * *

UNITED STATES PATENT AND TRADEMARK OFFICE
CERTIFICATE OF CORRECTION

PATENT NO. : 7,123,168 B2 Page 1 of 1
APPLICATION NO. : 10/422512
DATED : October 17, 2006
INVENTOR(S) : Kenneth Schofield It is certified that error appears in the above-identified patent and that said Letters Patent is hereby corrected as shown below:

Column 6
Line 20, insert --filed-- before "November 25, 1998"

Column 8
Claim 12, Line 33, "die" should be --the--

Column 9
Claim 18, Line 1, "activatable" should be --actuatable--

Column 9
Claim 18, Line 22, insert --,-- after "condition"

Column 10
Claim 32, Line 41, "as least" should be --at least--

Signed and Sealed this

Tenth Day of February, 2009

JOHN DOLL
*Acting Director of the United States Patent and Trademark Office*